United States Patent
Kim et al.

(10) Patent No.: US 10,985,992 B2
(45) Date of Patent: Apr. 20, 2021

(54) SYSTEM AND METHOD FOR CONFIGURING CLUSTER OF VIRTUALIZATION NETWORK FUNCTIONS

(71) Applicant: FOUNDATION OF SOONGSIL UNIVERSITY-INDUSTRY COOPERATION, Seoul (KR)

(72) Inventors: Young Han Kim, Seoul (KR); Hyun Sik Yang, Seoul (KR)

(73) Assignee: FOUNDATION OF SOONGSIL UNIVERSITY-INDUSTRY COOP.

( * ) Notice: Subject to any disclaimer, the term of this patent is extended or adjusted under 35 U.S.C. 154(b) by 0 days.

(21) Appl. No.: 16/560,110

(22) Filed: Sep. 4, 2019

(65) Prior Publication Data

US 2020/0084110 A1 Mar. 12, 2020

(30) Foreign Application Priority Data

Sep. 6, 2018 (KR) .................. 10-2018-0106370

(51) Int. Cl.
*G06F 15/16* (2006.01)
*H04L 12/24* (2006.01)
*G06F 9/455* (2018.01)

(52) U.S. Cl.
CPC .......... *H04L 41/12* (2013.01); *G06F 9/45558* (2013.01); *H04L 41/0893* (2013.01); *G06F 2009/45595* (2013.01)

(58) Field of Classification Search
CPC ... G06F 2009/4557; G06F 2009/45591; G06F 2009/45595; G06F 9/45558; H04L 41/0843; H04L 41/0893; H04L 41/12; H04L 43/0882

USPC ........................................................ 709/223
See application file for complete search history.

(56) References Cited

U.S. PATENT DOCUMENTS

| 9,806,979 | B1* | 10/2017 | Felstaine | ............. H04L 41/0893 |
|---|---|---|---|---|
| 10,140,112 | B2* | 11/2018 | Takano | ............... G06F 9/45558 |
| 2012/0297379 | A1* | 11/2012 | Anderson | ........... G06F 9/45558 718/1 |

(Continued)

FOREIGN PATENT DOCUMENTS

| KR | 20120063662 | 6/2012 |
|---|---|---|
| KR | 20160050585 | 5/2016 |
| KR | 20170010806 | 2/2017 |

*Primary Examiner* — Moustafa M Meky
*Assistant Examiner* — Thorne E Waugh
(74) *Attorney, Agent, or Firm* — Blueshift IP, LLC; Robert Plotkin

(57) ABSTRACT

According to one embodiment of the present invention, a system for configuring a cluster of virtualization network functions (VNFs) includes an infrastructure driver configured to register virtualized infrastructure managers (VIMs) of multiple sites distributed across a network, a monitoring tool configured to collect monitoring information through the registered VIMs, a request queue configured to receive a clustering request message, a network functions virtualization (NFV) embedder configured to define a resource requirement necessary for cluster creation using the monitoring information according to the clustering request message, a policy manager configured to form a clustering template according to the resource requirement, and a clustering engine configured to transmit a request for configuring a cluster to the VIMs according to the clustering template.

6 Claims, 3 Drawing Sheets

(56) References Cited

U.S. PATENT DOCUMENTS

| | | | |
|---|---|---|---|
| 2017/0063598 A1* | 3/2017 | Zhu | H04L 41/20 |
| 2017/0078143 A1* | 3/2017 | Zhao | H04L 41/04 |
| 2017/0078693 A1* | 3/2017 | Oh | H04N 19/159 |
| 2018/0276038 A1* | 9/2018 | Malik | G06F 9/45558 |
| 2019/0028350 A1* | 1/2019 | Yeung | H04L 41/0893 |
| 2019/0245741 A1* | 8/2019 | Ni | G06F 9/45558 |
| 2019/0245750 A1* | 8/2019 | Banda | H04L 41/0896 |
| 2019/0340007 A1* | 11/2019 | Malik | G06F 9/45558 |
| 2020/0267052 A1* | 8/2020 | Mahimkar | H04L 41/085 |

* cited by examiner

SYSTEM AND METHOD FOR CONFIGURING CLUSTER OF VIRTUALIZATION NETWORK FUNCTIONS

CROSS-REFERENCE TO RELATED APPLICATION

This application claims priority to and the benefit of Korean Patent Application No. 10-2018-0106370, filed on Sep. 6, 2018, the disclosure of which is incorporated herein by reference in its entirety.

BACKGROUND

1. Field of the Invention

The present invention relates to a system and method for configuring a cluster of virtualization network functions (VNFs), and more specifically, to a system and method for configuring a cluster of VNFs which are applicable to a network functions virtualization (NFV) multi-site environment.

2. Discussion of Related Art

Network functions virtualization (NFV) systems are technologies for controlling and managing virtual network functions in software. In particular, a service function chaining (SFC) technology, in which virtualization network functions (VNFs) are sequenced, connected, and executed, is drawing attention as the next issue for research on NFV since this technology allows for automation and customization of major network services. A function model of the SFC technology is being developed under the name of VNF forwarding graph by the European Telecommunication Standards Institute (ETSI) Industry Specification Group for Network Functions Virtualization (ETSI ISG NFV), and standardization of detailed function architecture and protocols is in progress in the Internet Engineering Task Force (IETF) SFC working group (IETF SFC WG).

SFC allows a network operator to dynamically create new service functions (SFs) in a virtualized environment and can reduce the complexity in setting SFs. The SFC is an ordered set of SFs, and the SFs are classified into stateful SFs and stateless SFs. Here, the stateful SF refers to a SF that only operates with pieces of state information, and the stateless SF refers to a SF that can operate without state information.

Currently, fault recovery mechanisms for SFs have different characteristics. When these mechanisms are applied to both the stateful SF and the stateless SF in an actual network, a large amount of resources may be wasted, and accordingly, there is a disadvantage in that the network is insufficiently managed.

SUMMARY OF THE INVENTION

In one general aspect, there is provided a system and method for configuring a cluster of virtualization network functions (VNFs) which are capable of providing a clustering service of VNFs in a multi-cloud environment.

According to one embodiment of the present invention, there is provided a system for configuring a cluster of virtualization network functions (VNFs) including an infrastructure driver configured to register a virtualized infrastructure manager (VIM) of multiple sites distributed across a network, a monitoring tool configured to collect monitoring information through the registered VIM, a request queue configured to receive a clustering request message; a network functions virtualization (NFV) embedder configured to define a resource requirement necessary for cluster creation using the monitoring information according to the clustering request message, a policy manager configured to form a clustering template according to the resource requirement, and a clustering engine configured to transmit a request for configuring a cluster to the VIMs according to the clustering template.

The cluster may include VNFs distributed to the VIMs.

The cluster may further include a load balancer configured to distribute a traffic load in the cluster.

The cluster may further include a fault handler configured to perform recovery and service function replacement in the cluster.

The clustering template may include the number of active mode VNFs, the number of standby mode VNFs, and the VIM to be deployed.

The policy manager may determine the number of active mode VNFs and the number of standby VNFs according to the resource requirement.

The monitoring information may include monitoring information related to resources and virtual machine internal monitoring information.

The monitoring information related to the resources may include a specific site and available capacity, used capacity, free capacity, a bandwidth, and error information of a network and the virtual machine internal monitoring information may include state information of a virtual machine and function information of the virtual machine.

The cluster may be composed of at least one of active mode VNF-active mode VNF and active mode VNF-standby mode VNF by using the VNFs already generated or to be generated.

The policy manager may configure the number of active mode VNFs to be greater than the number of standby mode VNFs when it is determined from the state information of the virtual machine that utilization of computer resources and network resources is primarily required.

The policy manager may configure the number of active mode VNFs to be greater than the number of standby mode VNFs when it is determined from the function information of the virtual machine that utilization of computer resources and network resources is primarily required.

The policy manager may configure the number of standby mode VNFs to be greater than the number of active mode VNFs when it is determined from the function information of the virtual machine that utilization of computer resources and network resources is not relatively urgent.

According to another embodiment of the present invention, there is provided a method of configuring a cluster of virtualization network functions (VNFs) including registering a virtualized infrastructure manager (VIM) of multiple sites distributed across a network, collecting monitoring information through the registered VIM, receiving a clustering request message, defining a resource requirement necessary for cluster creation using the monitoring information according to the clustering request message, configuring a clustering template according to the resource requirement, and transmitting a request for configuring a cluster to the VIMs according to the clustering template.

The cluster may include VNFs distributed to the VIMs, a load balancer configured to distribute a traffic load in the cluster, and a fault handler configured to perform recovery and service function replacement in the cluster.

The clustering template may include the number of active mode VNFs, the number of standby mode VNFs, and the VIM to be deployed.

The configuring of the clustering template may include determining the number of active mode VNFs and the number of standby VNFs according to the resource requirement.

The monitoring information may include monitoring information related to resources and virtual machine internal monitoring information.

The monitoring information related to the resources may include a specific site and available capacity, used capacity, free capacity, a bandwidth, and error information of a network and the virtual machine internal monitoring information may include state information of a virtual machine and function information of the virtual machine.

The cluster may be composed of at least one of active mode VNF-active mode VNF and active mode VNF-standby mode VNF by using VNFs already generated or to be generated.

The configuring of the clustering template may include configuring the number of active mode VNFs to be greater than the number of standby mode VNFs when it is determined from the state information of the virtual machine that utilization of computer resources and network resources is primarily required, configuring the number of active mode VNFs to be greater than the number of standby mode VNFs when it is determined from the function information of the virtual machine that the utilization of the computer resources and the network resources is primarily required, and configuring the number of standby mode VNFs to be greater than the number of active mode VNFs when it is determined from the function information of the virtual machine that the utilization of the computer resources and the network resources is not relatively urgent.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
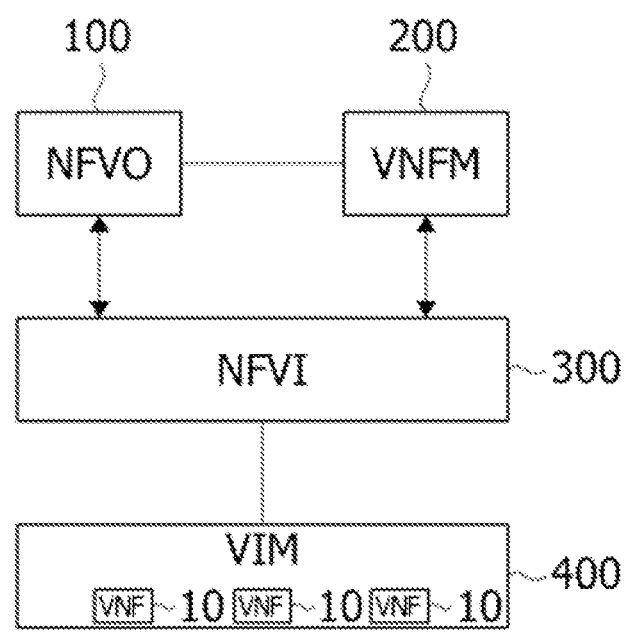
FIG. 1 is a conceptual diagram illustrating network functions virtualization (NFV) according to one embodiment of the present invention.

Hereinafter, exemplary embodiments of the present invention will be described in detail with reference to the accompanying drawings.

The technical ideas of the present invention are not limited to the embodiments set forth herein. The present invention may be embodied in many different forms. Within the technical scope of the invention, one or more elements of the embodiments may be selectively combined and/or replaced by other elements.

In addition, unless explicitly described to the contrary, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art.

Also, the terminology used herein is for the purpose of describing particular embodiments only and is not intended to be limiting to the invention.

In the description, the singular forms "a", "an," and "the" are intended to include the plural forms as well, unless the context clearly indicates otherwise. It will be understood that "at least one (or one or more) of A, B, and C" includes one or more of any combinations of A, B, and C.

Also, terms such as "first," "second," "A," "B," "(a)," and "(b)" may be used to describe elements of the present invention. These are solely for the purpose of differentiating one element from another but not to imply or suggest the substances, order, or sequence of the elements.

If an element is described as being "connected to," "coupled to," or "accessing" another element, it is not only directly connected to, coupled to, or accessing another element, but also is indirectly "connected to," "coupled to," or "accessing" another element via still another element.

In addition, in the description of the present invention, it will be understood that, when an element is referred to as being formed "on" or "under" another element, it can be directly "on" or "under" another element or be indirectly formed with intervening one or more other elements therebetween. In addition, when an element is referred to as being formed "on or under", the term encompasses both an orientation of above and below.

Hereinafter, the exemplary embodiments of the present invention will be described in detail with reference to the accompanying drawings. The same or corresponding elements will be consistently denoted by the same respective reference numerals and described in detail no more than once regardless of drawing symbols.

Figure 2:
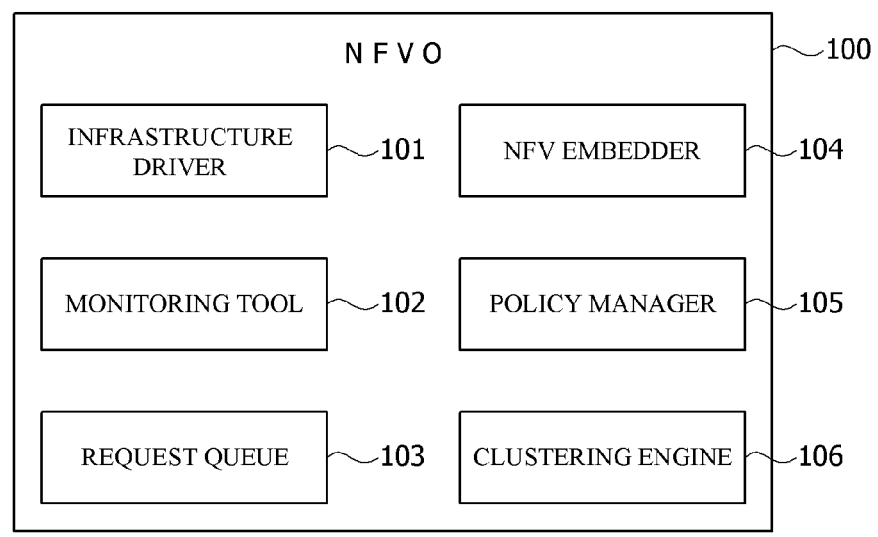
FIG. 2 is a block diagram illustrating a configuration of a system for configuring a cluster of virtualization network functions (VNFs) according to one embodiment of the present invention.

FIG. 1 is a conceptual diagram illustrating network functions virtualization (NFV) according to one embodiment of the present invention, and FIG. 2 is a block diagram illustrating a configuration of a system for configuring a cluster of virtualization network functions (VNFs) according to one embodiment of the present invention.

Referring to FIGS. 1 and 2, the NFV according to one embodiment of the present invention may be formed to include a network function virtualization orchestrator (NFVO) 100 for orchestration of the overall operation, a virtualization network function manager (VNFM) 200 for management of virtualization network functions, a network function virtualization infrastructure (NFVI) 300, a virtualized infrastructure manager (VIM) 400 for management of a virtualization infrastructure, and a plurality of VNFs 10.

At least one VNF instance may be present in the VNF 10, and an element management (EM) (not shown) that corresponds to each VNF may be present. Actual physical hardware, a virtualization layer that virtualizes actual physical hardware resources, and virtualized resources created by the virtualization layer may be present on the NFVI 300.

The NFV may include the NFVO 100 and the VNFM 200 for managing and orchestrating components.

The NFV may serve to manage virtual resources (e.g., computing resources, network resources, and storage resources) and to orchestrate the virtual resources. Thus, the NFV may check the availability of virtual resources for a network service composed of the plurality of VNFs 10, be responsible for actual distribution of the virtual resources, configure distribution order of the VNFs and the relative information, and transmit the distribution order and relative information to various NFVIs 300 in order to successfully initiate the service.

The VNFM 200 between the VNFs 10, the virtual resources, and the NFVO 100 for overall control of the service may manage the lifecycle of the VNFs 10. Specifically, the VNFM 200 may manage an association between the virtual resources and the VNFs 10 in a cloud environment and immediately respond to an event or a state change occurring therebetween, thereby maintaining and optimizing continuity of the service provided by the VNFs 10.

The NFVI 300 may include hardware elements and software elements configured as an environment in which the VNFs 10 can be performed and may include OpenStack based on open-sources, CloudStack, and the like. Each NFVI 300 may provide a unique application program interface.

The NFVI 300 may be divided into three domains, a compute domain (including storage), a hypervisor domain, an infrastructure network domain. Virtual computing and virtual storage that belong to the hypervisor domain refer to virtual resources to be allocated to a virtual machine on the basis of physical resources, and a virtualization layer refers to a hypervisor, such as a kernel-based virtual machine (KVM) and Xen.

Computing hardware and storage hardware which belong to the computer domain refer to physical hardware resources, a virtual network belonging to the infrastructure network domain refers to a virtual network to be allocated to a virtual machine, and network hardware refers to a physical network device. The NFVI 300 has the VIM 400 and a reference point Nf-Vi and has Vn-Nf reference architecture formed with the VNF.

In an NFV environment, a VNF instance may be installed or deleted from time to time as necessary. In this case, the VNF instance may be installed/modified/deleted through the VNFM 200 provided for each vendor.

Traffic entering into the NFV may be classified using a virtual port allocated to a virtual machine (VM) that implements the VNF 10. Thus, a flow rule in which a destination media access control (MAC) address is a MAC address of a virtual port allocated to a virtual machine that implements a VNF of a target type is written and a filter of a corresponding service function chain may be generated.

The VNFs 10 constituting the service function chain may be implemented as virtual machines and may be implemented in the form of a flow rule using a service digital network (SDN).

According to one embodiment of the present invention, the system for configuring a cluster of VNFs may include an infrastructure driver 101, a monitoring tool 102, a request queue 103, a NFV embedder 104, a policy manager 105, and a clustering engine 106.

The system for configuring a cluster of VNFs according to one embodiment of the present invention may be formed to be included in the NFVO 100. In the embodiment of the present invention, a description is given of the system for configuring a cluster of VNFs which is formed to be included in the NFVO 100, but the system may be realized as a separated system.

First, the infrastructure driver 101 may register VIMs 400 of multiple sites distributed across a network. The infrastructure driver 101 may register the VIMs 400 deployed at several sites in the NFVO 100. The infrastructure driver 101 may register the VIMs 400 of multiple sites which are physically spaced apart from each other and may enable one NFVO 100 to manage the VIMs 400. In the embodiment of the present invention, a description will be given of a case where a VIM 400 of each site is registered in the NFVO at an initial stage.

The monitoring tool 102 may collect monitoring information through the registered VIMs 400. The monitoring information may include monitoring information related to resources and VM internal monitoring information. The monitoring tool 102 may monitor computing resources and network resources usable by the infrastructure through the infrastructure driver 101. Accordingly, the monitoring tool 102 may collect information of each VIM 400 and prepare information used for optimization. In the embodiment of the present invention, the computing resources and network resources may include specific sites and available capacity, used capacity, free capacity, bandwidth, and error information of a network which are collected from each VIM 400. In addition, the monitoring tool 102 may collect the internal monitoring information including state information and function information of a VM through the registered VIMs 400.

The request queue 103 may receive a clustering request message. When the request queue 103 receives a clustering request message, the request queue 103 may forward the clustering request message to the NFV embedder 104.

The NFV embedder 104 may define a resource requirement necessary for cluster creation using the computing resource information and the network resource information. The resource requirement may refer to a boundary of a VNF deployable according to the specific site and the available capacity, used capacity, free capacity, a bandwidth, and error information of the network on the basis of the information collected by the monitoring tool 102.

In the embodiment of the present invention, a cluster composed of active mode-active mode and/or active mode-standby mode may be configured using VNFs already generated or to be generated.

The clustering request message may be stored in the request queue 103 and the NFV embedder 104 may collect information from the request queue 103 and define the resource requirement necessary for cluster creation. In this case, the NFV embedder 104 may use information on current VIMs 400 which is collected from the monitoring tool 102.

The policy manager 105 may configure a clustering template according to the resource requirement. The clustering template may include the number of active mode VNFs, the number of standby mode VNFs, and a VIM to be deployed.

The policy manager 105 may determine deployment of the cluster by taking into account optimized resource use and resource distribution in multiple sites. In this case, deployment may be determined by taking into account the collected monitoring information and resource requirement. The policy manager 105 may determine the number of active mode VNFs and the number of standby mode VNFs according to the resource requirement.

The policy manager 105 may configure a clustering template using state information and function information of a VM, a specific site, and available capacity, used capacity, free capacity, bandwidth, and error information of a network through the registered VIMs 400. When it is determined from the state information of the VM that the utilization of computer resources and network resources is primarily required, the policy manager 105 may configure the number of active mode VNFs to be greater than the number of standby mode VNFs. Alternatively, when it is determined from the function information of the VM that the utilization of computer resources and network resources is primarily required, the policy manager 105 may configure the number of active mode VNFs to be greater than the number of standby mode VNFs. On the other hand, when it is determined from the function information of the VM that the utilization of computer resources and network resources is not relatively urgent, the policy manager 105 may configure the number of standby mode VNFs to be greater than the number of active mode VNFs.

A cluster 500 may include the VNF 10 distributed to the VIM 400.

In addition, the cluster 500 may include a load balancer 501 configured to distribute a traffic load in the cluster 500.

Also, the cluster 500 may include a fault handler 502 configured to perform recovery and service function replacement in the cluster 500.

The clustering engine 106 may transmit a request for configuring a cluster to the VIM according to the clustering template. The policy manager 105 may configure a template to which the monitoring information and the resource requirement are applied and may forward the template to each VIM 400 for actual distribution.

The clustering engine 106 may request each VIM 400 to configure a cluster according to the clustering template. In this case, the clustering engine 106 may configure the cluster 500 by including the VNF 10, the load balancer 501, and the fault handler 502 in the cluster 500.

In the embodiment of the present invention, the VNFs 10 may be distributed in the form of a cluster in order to provide high usability of a network service on multiple sites, and the form of the cluster may vary according to the clustering template, which is a predefined policy.

Figure 3:
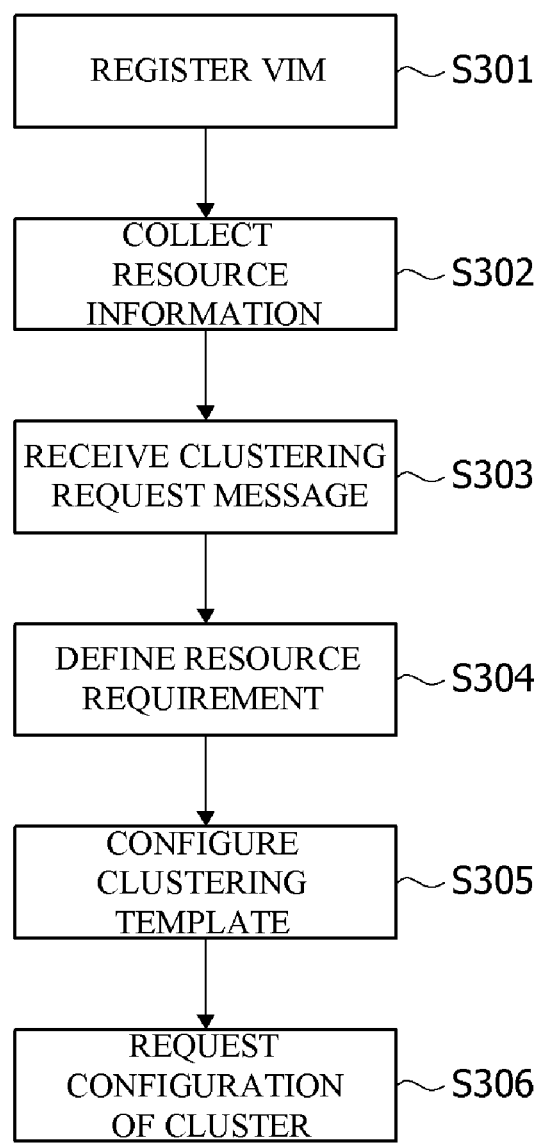
FIG. 3 is a flowchart illustrating a method of configuring a cluster of virtualization network functions according to one embodiment of the present invention.

FIG. 3 is a flowchart illustrating a method of configuring a cluster of virtualization network functions according to one embodiment of the present invention.

First, an infrastructure driver registers VIMs of multiple sites distributed across a network (S301).

A monitoring tool collects computing resource information and network resource information through the registered VIMs (S302).

A request queue receives a clustering request message (S303).

A NFV embedder defines a resource requirement necessary for cluster creation using the monitoring information according to the clustering request message (S304).

A policy manager forms a clustering template according to the monitoring information and the resource requirement. In this case, the policy manager determines the number of active mode VNFs and the number of standby mode VNFs according to the resource requirement (S305).

A clustering engine transmits a request for configuring a cluster to a VIM according to the clustering template (S306).

The system and method for configuring a cluster of VNFs can provide a clustering service of VNFs in a multi-cloud environment.

In addition, it is possible to collect information related to computing resources and network resources usable on a network and to provide optimized cluster deployment architecture.

The term "unit", as used in the embodiments, may refer to, but is not limited to, a software or hardware component such as a field programmable gate array (FPGA) or application specific integrated circuit (ASIC) which performs certain tasks. A unit may advantageously reside on the addressable storage medium and be configured to execute one or more processors. Thus, a unit may include, by way of example, components such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units. In addition, the components and units may be implemented such that they execute one or more CPUs in a device or a secure multimedia card.

It should be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A system, including a CPU coupled to a memory for configuring a cluster of virtualization network functions (VNFs), the system comprising:

an infrastructure driver configured to register a virtualized infrastructure manager (VIM) of multiple sites distributed across a network;

a monitoring tool configured to collect monitoring information comprising monitoring information related to computing resources, network resources and VM internal monitoring information through the registered VIM;

a request queue configured to receive a clustering request message;

a network functions virtualization (NFV) embedder configured to define a resource requirement necessary for cluster creation using the monitoring information according to the clustering request message;

a policy manager configured to form a clustering template comprising a number of active mode VNFs, a number of standby mode VNFs, and a VIM to be deployed according to the resource requirement; and a clustering engine configured to transmit a request for configuring a cluster to the VIMs according to the clustering template, wherein the computing resources and network resources include available capacity, used capacity, free capacity, bandwidth, and error information of a specific sites and a network, wherein the VM internal monitoring information includes state information and function information of a VM, wherein the resource requirement is a boundary of a VNF deployable according to the available capacity, the used capacity, the free capacity, the bandwidth, and the error information of the specific sites and the network, wherein the cluster is composed of at least one of active mode VNF-active mode VNF and active mode VNF-standby mode VNF by using the VNFs already generated or to be generated, wherein the policy manager configures the number of active mode VNFs to be greater than the number of standby mode VNFs when it is determined from the state information of the virtual machine that utilization of computer resources and network resources is primarily required, wherein the policy manager configures the number of active mode VNFs to be greater than the number of standby mode VNFs when it is determined from the function information of the virtual machine that utilization of computer resources and network resources is primarily required and wherein the policy manager configures the number of standby mode VNFs to be greater than the number of active mode VNFs when it is determined from the function information of the virtual machine that utilization of computer resources and network resources is not relatively urgent.

2. The system of claim 1, wherein the cluster includes VNFs distributed to the VIMs.

3. The system of claim 2, wherein the cluster further includes a load balancer configured to distribute a traffic load in the cluster.

4. The system of claim 2, wherein the cluster further includes a fault handler configured to perform recovery and service function replacement in the cluster.

5. A method of configuring a cluster of virtualization network functions (VNFs), the method comprising:
   registering a virtualized infrastructure manager (VIM) of multiple sites distributed across a network;
   collecting monitoring information comprising monitoring information related to computing resources, network resources and VM internal monitoring information through the registered VIM;
   receiving a clustering request message;
   defining a resource requirement necessary for cluster creation using the monitoring information according to the clustering request message;
   configuring a clustering template comprising a number of active mode VNFs, a number of standby mode VNFs, and a VIM to be deployed according to the resource requirement; and
   transmitting a request for configuring a cluster to the VIMs according to the clustering template,
   wherein the computing resources and network resources include available capacity, used capacity, free capacity, bandwidth, and error information of a specific sites and a network,
   wherein the VM internal monitoring information includes state information and function information of a VM,
   wherein the resource requirement is a boundary of a VNF deployable according to the available capacity, the used capacity, the free capacity, the bandwidth, and the error information of the specific sites and the network,
   wherein the configuring of the clustering template includes:
   configuring the number of active mode VNFs to be greater than the number of standby mode VNFs when it is determined from the state information of the virtual machine that utilization of computer resources and network resources is primarily required;
   configuring the number of active mode VNFs to be greater than the number of standby mode VNFs when it is determined from the function information of the virtual machine that the utilization of the computer resources and the network resources is primarily required; and
   configuring the number of standby mode VNFs to be greater than the number of active mode VNFs when it is determined from the function information of the virtual machine that the utilization of the computer resources and the network resources is not relatively urgent.

6. The method of claim 5, wherein the cluster includes VNFs distributed to the VIMs, a load balancer configured to distribute a traffic load in the cluster, and a fault handler configured to perform recovery and service function replacement in the cluster.

* * * * *